US012717909B2

(12) United States Patent
Beveridge et al.

(10) Patent No.: US 12,717,909 B2
(45) **Date of Patent: *Aug. 25, 2026**

(54) GENERATIVE ARTIFICIAL INTELLIGENCE MODEL OUTPUT OBFUSCATION

(71) Applicant: HiddenLayer, Inc., Austin, TX (US)

(72) Inventors: David Beveridge, Vancouver, WA (US); Tanner Burns, Austin, TX (US); Kwesi Cappel, Austin, TX (US); Kenneth Yeung, Ottawa (CA)

(73) Assignee: HiddenLayer, Inc., Austin, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/806,572

(22) Filed: Aug. 15, 2024

(65) Prior Publication Data

US 2025/0356004 A1 Nov. 20, 2025

Related U.S. Application Data

(63) Continuation of application No. 18/669,379, filed on May 20, 2024, now Pat. No. 12,111,926.

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,802,298 | B1 | 9/2010 | Hong et al. |
| 9,350,748 | B1 | 5/2016 | McClintock et al. |
| 9,356,941 | B1 | 5/2016 | Kislyuk et al. |
| 9,516,053 | B1 | 12/2016 | Muddu et al. |
| 10,121,104 | B1 | 11/2018 | Hu et al. |
| 10,193,902 | B1 | 1/2019 | Caspi et al. |
| 10,205,735 | B2 | 2/2019 | Apostolopoulos |
| 10,210,036 | B2 | 2/2019 | Iyer et al. |
| 10,462,168 | B2 | 10/2019 | Shibahara et al. |
| 10,637,884 | B2 | 4/2020 | Apple et al. |
| 10,673,880 | B1 | 6/2020 | Pratt et al. |

(Continued)

OTHER PUBLICATIONS

Dinan et al., 2021, "Anticipating safety issues in e2e conversational ai: Framework and tooling," arXiv preprint arXiv:2107.03451v3 (43 pages).

(Continued)

*Primary Examiner* — Christopher C Harris
(74) *Attorney, Agent, or Firm* — Jones Day

(57) ABSTRACT

An analysis engine receives data characterizing a prompt for ingestion by a generative artificial intelligence (GenAI) model. The analysis engine, using a determines using, for example, a classifier or blocklist, that the prompt comprises or is indicative of malicious content or otherwise elicits undesired model behavior. Similarly, outputs of the GenAI model can be analyzed to determine whether they comprise malicious content or cause the model to behave in an undesired manner. The output is inputted into a GenAI model along with obfuscation instructions to generate an output which is returned to the requesting user. Related apparatus, systems, techniques and articles are also described.

30 Claims, 14 Drawing Sheets

(56) References Cited

U.S. PATENT DOCUMENTS

| | | | |
|---|---|---|---|
| 10,764,313 B1 | 9/2020 | Mushtaq | |
| 10,803,188 B1 | 10/2020 | Rajput et al. | |
| 10,824,721 B2 | 11/2020 | Kesarwani et al. | |
| 11,310,270 B1 | 4/2022 | Weber et al. | |
| 11,483,327 B2 | 10/2022 | Hen et al. | |
| 11,501,101 B1 | 11/2022 | Ganesan et al. | |
| 11,551,137 B1 | 1/2023 | Echauz et al. | |
| 11,601,468 B2 | 3/2023 | Angel et al. | |
| 11,710,045 B2 | 7/2023 | Lee et al. | |
| 11,710,067 B2 | 7/2023 | Harris et al. | |
| 11,762,998 B2 | 9/2023 | Kuta et al. | |
| 11,777,957 B2 | 10/2023 | Chen et al. | |
| 11,875,130 B1 | 1/2024 | Bosnjakovic et al. | |
| 11,893,111 B2 | 2/2024 | Sai et al. | |
| 11,893,358 B1 | 2/2024 | Lakshmikanthan et al. | |
| 11,930,030 B1 | 3/2024 | Burns et al. | |
| 11,930,039 B1 | 3/2024 | Geethakumar et al. | |
| 11,954,199 B1 | 4/2024 | Burns et al. | |
| 11,960,514 B1 | 4/2024 | Taylert et al. | |
| 11,962,546 B1 | 4/2024 | Hattangady et al. | |
| 11,971,914 B1 | 4/2024 | Watson et al. | |
| 11,972,333 B1 | 4/2024 | Horesh et al. | |
| 11,995,180 B1 | 5/2024 | Cappel et al. | |
| 11,997,059 B1 | 5/2024 | Su et al. | |
| 12,026,255 B1 | 7/2024 | Burns et al. | |
| 12,105,844 B1 | 10/2024 | Burns et al. | |
| 12,107,885 B1 | 10/2024 | Kawasaki et al. | |
| 12,111,747 B1 * | 10/2024 | Jain | G06N 3/0455 |
| 12,124,592 B1 | 10/2024 | O'Hern et al. | |
| 12,130,917 B1 | 10/2024 | Yeung et al. | |
| 12,130,943 B1 | 10/2024 | Burns et al. | |
| 12,137,118 B1 | 11/2024 | Kawasaki et al. | |
| 12,174,954 B1 | 12/2024 | Yeung et al. | |
| 12,182,264 B2 | 12/2024 | Sinha et al. | |
| 12,197,859 B1 | 1/2025 | Malviya et al. | |
| 12,204,323 B1 | 1/2025 | Malviya et al. | |
| 12,229,265 B1 | 2/2025 | Yeung et al. | |
| 12,248,883 B1 | 3/2025 | Rideout et al. | |
| 12,293,277 B1 | 5/2025 | Yeung et al. | |
| 2010/0082811 A1 | 4/2010 | Van Der Merwe | |
| 2014/0033307 A1 | 1/2014 | Schmidtler | |
| 2014/0157415 A1 | 6/2014 | Abercrombie et al. | |
| 2015/0074392 A1 | 3/2015 | Boivie et al. | |
| 2016/0344770 A1 | 11/2016 | Verma et al. | |
| 2017/0154021 A1 | 6/2017 | Vidhani et al. | |
| 2017/0251006 A1 | 8/2017 | LaRosa et al. | |
| 2017/0331841 A1 | 11/2017 | Hu et al. | |
| 2018/0018590 A1 | 1/2018 | Szeto et al. | |
| 2018/0063190 A1 | 3/2018 | Wright et al. | |
| 2018/0205734 A1 | 7/2018 | Wing et al. | |
| 2018/0219888 A1 | 8/2018 | Apostolopoulos | |
| 2018/0324193 A1 | 11/2018 | Ronen et al. | |
| 2019/0050564 A1 | 2/2019 | Pogorelik et al. | |
| 2019/0238568 A1 | 8/2019 | Goswami et al. | |
| 2019/0238572 A1 | 8/2019 | Manadhata et al. | |
| 2019/0260784 A1 | 8/2019 | Stockdale et al. | |
| 2019/0311118 A1 | 10/2019 | Grafi et al. | |
| 2019/0392176 A1 | 12/2019 | Taron et al. | |
| 2020/0019721 A1 | 1/2020 | Shanmugam et al. | |
| 2020/0076771 A1 | 3/2020 | Maier et al. | |
| 2020/0092299 A1 | 3/2020 | Srinivasan et al. | |
| 2020/0175094 A1 | 6/2020 | Palmer et al. | |
| 2020/0219009 A1 | 7/2020 | Dao et al. | |
| 2020/0233979 A1 | 7/2020 | Maraghoosh et al. | |
| 2020/0279192 A1 | 9/2020 | Godfrey et al. | |
| 2020/0285737 A1 | 9/2020 | Kraus et al. | |
| 2020/0313849 A1 | 10/2020 | Kar et al. | |
| 2020/0364333 A1 | 11/2020 | Derks et al. | |
| 2020/0403826 A1 | 12/2020 | Dawani et al. | |
| 2020/0409323 A1 | 12/2020 | Spalt et al. | |
| 2021/0110062 A1 | 4/2021 | Oliner et al. | |
| 2021/0141897 A1 | 5/2021 | Seifert et al. | |
| 2021/0209464 A1 | 7/2021 | Bala et al. | |
| 2021/0218673 A1 | 7/2021 | Ma et al. | |
| 2021/0224425 A1 | 7/2021 | Nasr-Azadani et al. | |
| 2021/0303695 A1 | 9/2021 | Grosse et al. | |
| 2021/0319098 A1 | 10/2021 | Pogorelik et al. | |
| 2021/0319784 A1 | 10/2021 | Le Roux et al. | |
| 2021/0357508 A1 | 11/2021 | Elovici et al. | |
| 2021/0374247 A1 | 12/2021 | Sultana et al. | |
| 2021/0407051 A1 | 12/2021 | Pardeshi et al. | |
| 2022/0030009 A1 | 1/2022 | Hasan | |
| 2022/0058444 A1 | 2/2022 | Olabiyi et al. | |
| 2022/0070195 A1 | 3/2022 | Sern et al. | |
| 2022/0083658 A1 | 3/2022 | Shah et al. | |
| 2022/0114399 A1 | 4/2022 | Castiglione et al. | |
| 2022/0147597 A1 | 5/2022 | Bhide et al. | |
| 2022/0164444 A1 | 5/2022 | Prudkovskij et al. | |
| 2022/0166795 A1 | 5/2022 | Simioni et al. | |
| 2022/0182410 A1 | 6/2022 | Tupsamudre et al. | |
| 2022/0253464 A1 | 8/2022 | Sloane et al. | |
| 2022/0269796 A1 | 8/2022 | Chase et al. | |
| 2022/0284283 A1 | 9/2022 | Yin et al. | |
| 2022/0309179 A1 | 9/2022 | Payne et al. | |
| 2023/0008037 A1 | 1/2023 | Venugopal et al. | |
| 2023/0027149 A1 | 1/2023 | Kuan et al. | |
| 2023/0049479 A1 | 2/2023 | Mozo Velasco et al. | |
| 2023/0109426 A1 | 4/2023 | Hashimoto et al. | |
| 2023/0111744 A1 | 4/2023 | Chandrasekaran et al. | |
| 2023/0128947 A1 | 4/2023 | Bhaskar et al. | |
| 2023/0148116 A1 | 5/2023 | Stokes et al. | |
| 2023/0169397 A1 | 6/2023 | Smith et al. | |
| 2023/0185912 A1 | 6/2023 | Sinn et al. | |
| 2023/0185915 A1 | 6/2023 | Rao et al. | |
| 2023/0208869 A1 | 6/2023 | Bisht et al. | |
| 2023/0229960 A1 | 7/2023 | Zhu et al. | |
| 2023/0252178 A1 | 8/2023 | Ruelke et al. | |
| 2023/0259787 A1 | 8/2023 | David et al. | |
| 2023/0269263 A1 | 8/2023 | Yarabolu | |
| 2023/0274003 A1 | 8/2023 | Liu et al. | |
| 2023/0289604 A1 | 9/2023 | Chan et al. | |
| 2023/0351143 A1 | 11/2023 | Kutt et al. | |
| 2023/0359903 A1 | 11/2023 | Cefalu et al. | |
| 2023/0359924 A1 | 11/2023 | Maman et al. | |
| 2023/0385085 A1 | 11/2023 | Singh | |
| 2023/0388324 A1 | 11/2023 | Thompson | |
| 2024/0005690 A1 | 1/2024 | Brodie et al. | |
| 2024/0007469 A1 | 1/2024 | Wang et al. | |
| 2024/0022585 A1 | 1/2024 | Burns et al. | |
| 2024/0031026 A1 | 1/2024 | Fujisawa et al. | |
| 2024/0039948 A1 | 2/2024 | Koc et al. | |
| 2024/0045959 A1 | 2/2024 | Marson et al. | |
| 2024/0054233 A1 * | 2/2024 | Ohayon | G06F 21/54 |
| 2024/0078337 A1 | 3/2024 | Kamyshenko et al. | |
| 2024/0080333 A1 | 3/2024 | Burns et al. | |
| 2024/0126611 A1 | 4/2024 | Phanishayee et al. | |
| 2024/0127065 A1 | 4/2024 | Ren et al. | |
| 2024/0160902 A1 | 5/2024 | Padgett et al. | |
| 2024/0289628 A1 | 8/2024 | Parmar et al. | |
| 2024/0289863 A1 | 8/2024 | Smith Lewis et al. | |
| 2024/0296315 A1 | 9/2024 | Singh et al. | |
| 2024/0386103 A1 | 11/2024 | Clement et al. | |
| 2024/0414177 A1 | 12/2024 | Lal et al. | |
| 2024/0427986 A1 | 12/2024 | Shakarian et al. | |
| 2025/0086455 A1 | 3/2025 | Yang et al. | |
| 2025/0103715 A1 * | 3/2025 | Jackson | G06F 21/566 |
| 2025/0284805 A1 * | 9/2025 | Hen | G06F 21/554 |
| 2025/0307418 A1 * | 10/2025 | Spencer | G06F 21/577 |

OTHER PUBLICATIONS

Morozov et al., 2019, "Unsupervised Neural Quantization for Compressed-Domain Similarity Search," International Conference on Computer Vision (ICCV) 2019 (11 pages).

Rijthoven et al., 2021, "HookNet: Multi-resolution convulational neural networks for semantic segmentation in histopathology whole-slide images," Medical Imange Analysis 68:1-10.

Wang et al., 2023, "Self-Deception: Reverse Penetrating the Semantic Firewall of Large Language Models," arXiv:2308.11521v1 [cs.CL] Aug. 16, 2023 (15 pages).

Shayegani et al., 2023, "Survey of Vulnerabilities in Large Language Models Revealed by Adversarial Attacks," arXiv:2310.10844v1 [cs.CL ] Oct. 16, 2023 (54 pages).

(56) References Cited

OTHER PUBLICATIONS

Bezymiannyi et al., 2023, "Filter for confidential information," Electronics and Control Systems 4(78):21-25 (5 pages).
Wang et al., 2023, "Self-Guard: Empower the LLM to Safeguard Itself," ACL Anthology, NAACL (21 pages).
Automorphic.ai, 2024, "Github—automorphic-ai/aegis: Self-hardening firewall for large language models," XP093278213, Available online at https://web.archive.org/web/20240222171700/https://github.com/automorphic-ai/aegis (2 pages).
Sun et al., "CONSCENDI: A Contrastive and Scenario-Guided Distillation Approach to Guardrail Models for Virtual Assistants," arXiv:2304.14364v1 [cs.CL] Apr. 27, 2023 (20 pages).
Hu et al., "Gradient Cuff: Detecting Jailbreak Attacks on Large Language Models by Exploring Refusal Loss Landscapes," arXiv:2403.00867v1 [cs.CR] Mar. 1, 2024 (19 pages).
Robey et al., "SmoothLLM: Defending Large Language Models Against Jailbreaking Attacks," arXiv:2310.03684v3 [cs.LG] Nov. 29, 2023 (42 pages).
Mohtashami et al., "SocialLearning: Towards Collaborative Learning with Large Language Models," arXiv:2312.11441v2 [cs.LG] Feb. 8, 2024 (19 pages).

* cited by examiner

700
CLIENT DEVICE 110
CLIENT DEVICE 110
CLIENT DEVICE 110
CLASSIFIER 194
PROXY 150
ANALYSIS ENGINE 152
REMEDIATION ENGINE 154
MLA 130
MODEL ENVIRONMENT 140
ANALYSIS ENGINE 170
MONITORING ENVIRONMENT 160
EXTERNAL REMEDIATION RESOURCES 190
CLASSIFIER 192

800
CLIENT DEVICE 110
CLIENT DEVICE 110
CLIENT DEVICE 110
PROXY 150
ANALYSIS ENGINE 152
CLASSIFIER 194
MLA 130
MODEL ENVIRONMENT 140
ANALYSIS ENGINE 170
MONITORING ENVIRONMENT 160
CLASSIFIER 192
EXTERNAL REMEDIATION RESOURCES 190

GENERATIVE ARTIFICIAL INTELLIGENCE MODEL OUTPUT OBFUSCATION

RELATED APPLICATION

This application claims priority to U.S. patent application Ser. No. 18/669,379 filed on May 20, 2024, the contents of which are hereby fully incorporated by reference.

TECHNICAL FIELD

The subject matter described herein relates to machine learning-based techniques for obfuscating undesired outputs of an artificial intelligence (AI) model, such as a large language model classifier.

BACKGROUND

Machine learning (ML) algorithms and models, such as large language models, ingest large amounts of data and use pattern recognition and other techniques to make predictions and adjustments based on that data. These models have attack surfaces that can be vulnerable to cyberattacks in which adversaries attempt to manipulate the model to cause it to behave in an undesired manner. These attacks can act to corrupt input data so as to make outputs unreliable or incorrect. By modifying or otherwise manipulating the input of a model, an attacker can modify an output of an application or process for malicious purposes including bypassing security measures resulting in data leakage, unauthorized system access, and the solicitation of unlawful or otherwise restricted information.

SUMMARY

In a first aspect, data is received from a requester (e.g., a remote computing device/client device, etc.) which characterizes a prompt for ingestion by a first generative artificial intelligence (GenAI) model. It can be determined that the prompt comprises malicious content or elicits undesired model behavior. Either before or after such determination, at least a portion of the received data can be input into the GenAI model to obtain a first output. Based on the determination, at least a portion of the first output along with obfuscation instructions can be input into a second GenAI model to obtain a second output. Data characterizing the second output is then returned to the requesting user.

In a further aspect, data is received from a requester which characterizes a prompt for ingestion by a first GenAI model. At least a portion of the received data is input into the first GenAI model to obtain a first output. It is then determined that the first output comprises or elicits malicious or undesired content. In response, at least a portion of the first output are input along with obfuscation instructions into a second GenAI model to obtain a second output. Data characterizing the second output is then returned to the requester.

In a still further interrelated aspect, a prompt is received from a requester for ingestion by a first GenAI model. It is determined that the prompt comprises or elicits malicious content or undesired model behavior. Before or after the determination, the prompt is input into the first GenAI model to obtain a first output. Subsequently, the prompt, the first output and accompanying obfuscation instructions are inputted into a second GenAI model to obtain a second output. Data characterizing the second output is then returned to the requester.

In yet another interrelated aspect, a prompt is received from a requester for ingestion by a first GenAI model. The prompt is input into the first GenAI model to obtain a first output. It is later determined that the first output comprises or elicits malicious or undesired model behavior. Subsequently, the prompt along with obfuscation instructions is input into a second GenAI model to obtain a second output. Data characterizing the second output can be returned to the user. In some cases, the first output is also input into the second GenAI model along with the prompt and the obfuscation instructions.

The determinations as to whether the prompt and/or the output comprises malicious content or otherwise elicits undesired behavior can be based on a classification by a classifier (i.e., one or more other machine learning models). In addition or in the alternative, such determination can be based on a blocklist defining content deemed to be malicious or eliciting undesired model behavior.

In some variations, the first GenAI model is used to generated both the first output and the second output. In other variations, the second GenAI model is different than the first GenAI model. The second GenAI model can be local to the computing environment of the first GenAI model or, in other cases, it can be remote. The first and/or second GenAI models can take varying forms including a large language model.

The obfuscation instructions can take varying forms and can vary depending on what they accompany (e.g., the prompt, the first output and/or the second output). The obfuscation instructions can identify portions of the content which require modification and can specify how such portions should be modified. As an example, aspects can be replaced with synthetic data such as data intended to mimic personally identifiable information or other sensitive information such that the modified output appears to be genuine. In some cases, the obfuscation instructions can specify redactions, content additions, and other stylistic aspects such as length, content modality and the like. In other cases, the obfuscation instructions can provide that the modified output specify that model access has been denied without specifying a particular reason. In still other cases, the obfuscation instructions can be configured so as to generate an intentionally misleading modified output (i.e., a red herring). In other words, in some cases, the obfuscation instructions can be configured so that the modified output appears to the requesting user as a legitimate model response.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop adversarial attacks on artificial intelligence models including large language models. Further, the current subject matter can provide enhanced visibility into the health and security of an enterprise's machine learning assets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing cyberattacks on advanced artificial intelligence (AI) models including large language models. In particular, the current subject matter is directed to analyzing prompts of an GenAI model to determine, using machine learning, whether they are (i) malicious or otherwise seeking undesired model behavior or (ii) benign, and in some variations, a particular type of prompt injection attack can be identified. Malicious as used herein can refer to actions which cause the GenAI model to respond in an undesired manner. With these classifications, remediation actions can be taken in connection with the prompt including blocking the prompt, modifying the prompt, disconnecting the requesting device, disconnecting the account, and the like. The output of the GenAI model can also be monitored, for example, using the same or a different classifier so that other remedial actions can be taken with regard to the output including blocking the output, modifying the output (e.g., using machine learning), disconnecting the requesting device, disconnecting the account, and the like.

Figure 1:
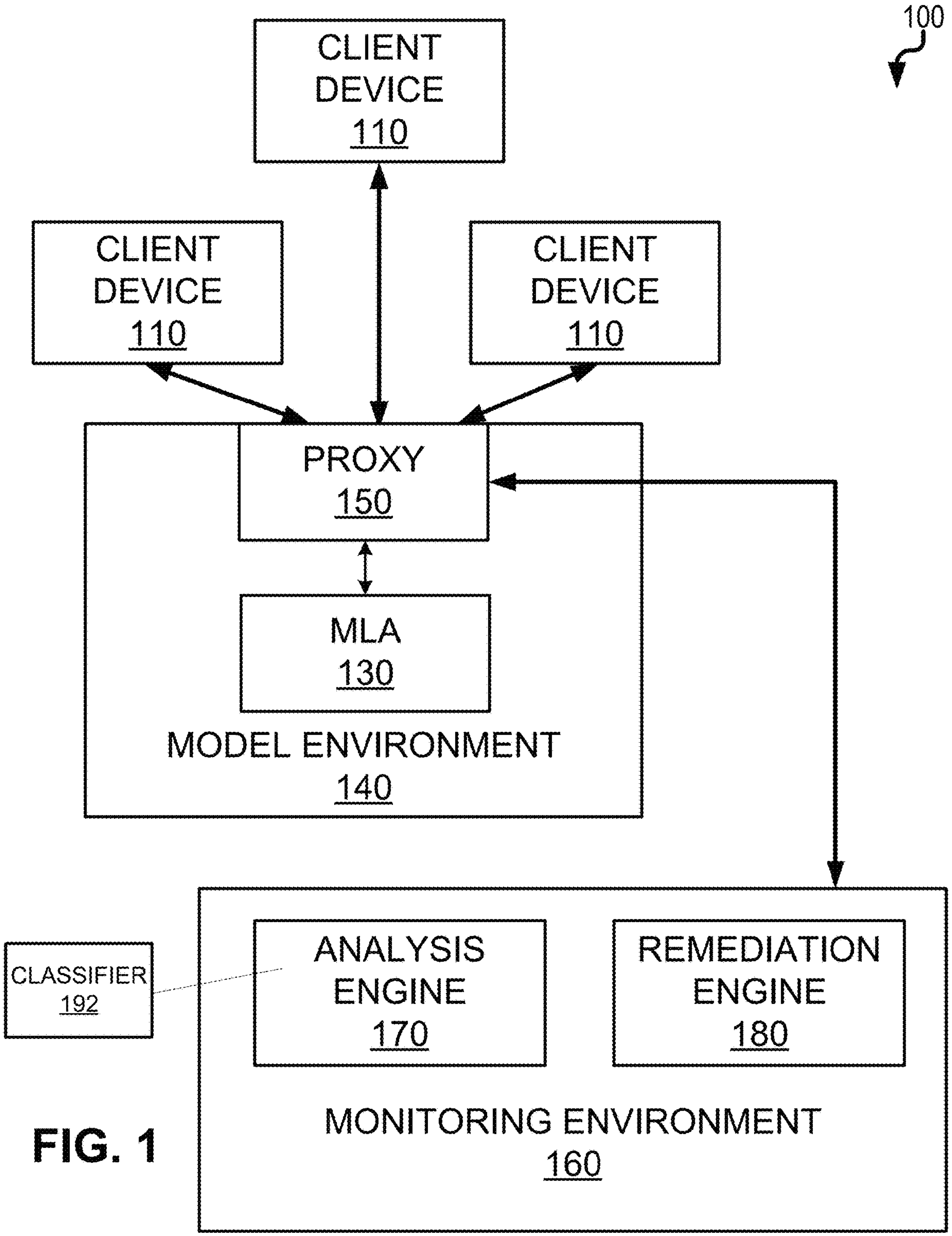
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
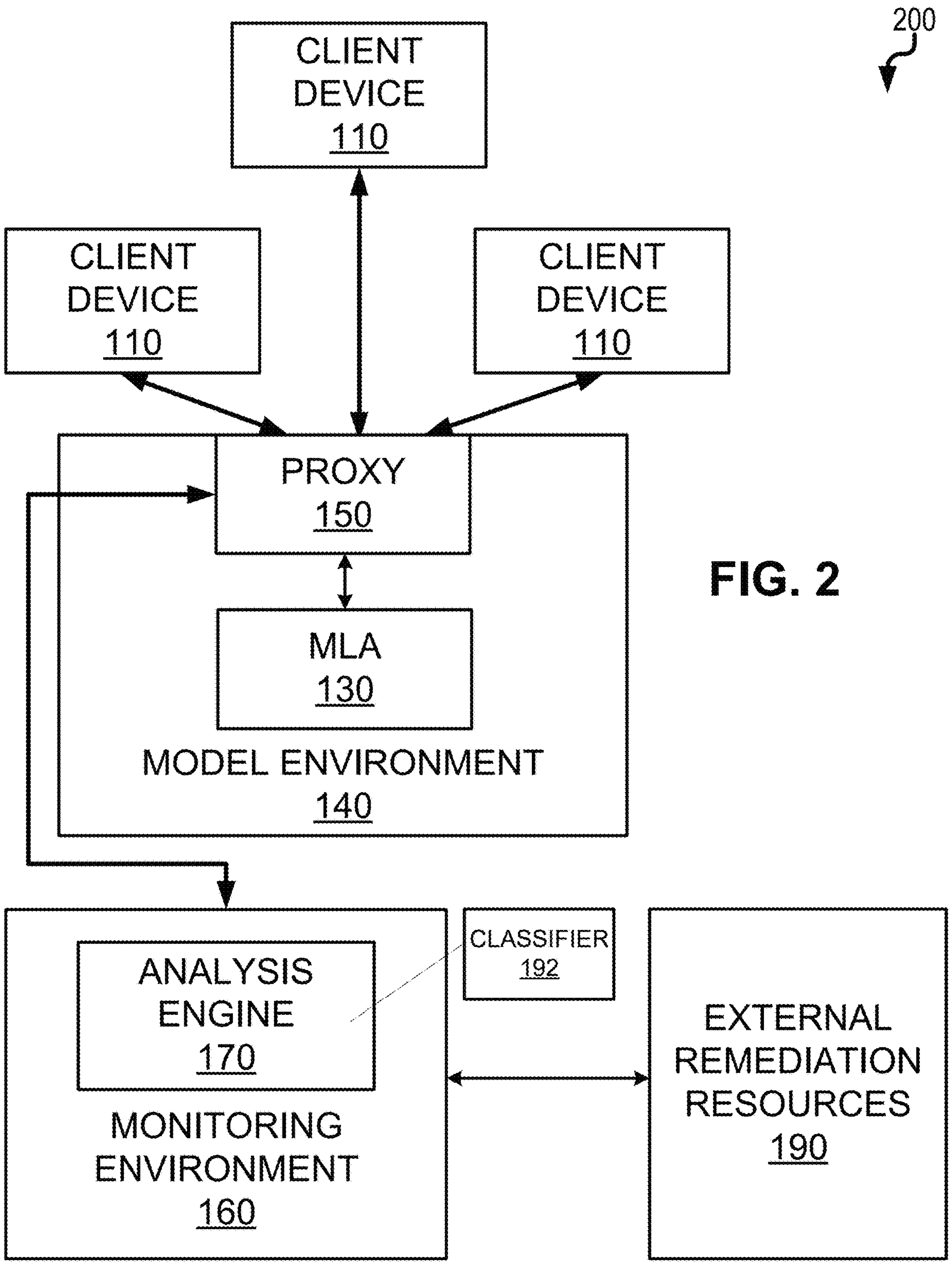
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious or otherwise eliciting undesired model behavior. In some cases, a remediation engine 180 which can form part of the monitoring environment 160 (or be external such as illustrated in FIG. 2) can take one or more remediation actions in response to a determination of a query as being malicious or otherwise eliciting undesired model behavior. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious or causing the MLA 130 to behave in an undesired manner. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

In some variations, the remediation engine 180 can modify an output of the MLA 130 using machine learning. This modification can be performed in response a determination that the prompt comprises or otherwise elicits undesired model behavior (e.g., malicious content, requesting sensitive information, seeking responses outside defined business purpose of the model environment 140, etc.). In one example, the remediation engine 180 causes the output along with obfuscation instructions to be ingested by the MLA 130 to generate a modified output (which can ultimately be related by back to the requesting client device 110). In some variations, some or all of the original prompt can be ingested by one or more machine learning models (e.g., MLA 130, an external LLM, etc.) along with both of the obfuscation instructions and the original output to result in a modified output. In other variations, obfuscation instructions along with the original output are ingested by one or more machine learning models (e.g., MLA 130, an external LLM, etc.) to the exclusion of the original output.

The obfuscation instructions can direct the MLA 130 to modify the original output so as to remove malicious or other undesired content. These obfuscation instructions can take various forms including how to modify the original output, aspect of the original output to delete, and other measures to make the output benign or otherwise compliant (e.g., complying with a blocklist, policy, etc.). If, for example, personally identifiable information (PII) is detected, the obfuscation instructions can flag the PII and ask that the MLA 130 replace such PII with synthetic data while preserving other aspects of the original output. Such an arrangement is advantageous in that it can give the modified output the appearance of being genuine (i.e., the original output). As the MLA 130 can comprise an ensemble of models, the model that generated the original output need not be the same model that generated the modified output (using the obfuscation instructions). In some cases, an LLM forming part of the MLA 130 is used to generate the modified output. In another example, if executable code is detected in the original output, the obfuscation instructions can instruct the MLA 130 to remove such executable code or generate corresponding pseudocode. In another example, the obfuscation instructions can instruct the MLA 130 to remove certain output modalities (e.g., images, video, audio, etc.) from the original output. The obfuscation instructions can, in some variations, include stylistic direction to the MLA 130 to cause it to change an appearance of the original output. In some variations, the obfuscation instructions can instruct the MLA 130 to generate new content to replace anything that is modified and the like.

In cases in which a prompt is seeking to access account information for an external user, the MLA 130, as an example, might, without the output obfuscation techniques provided herein, output a response such as: "It appears that you are trying to access account information as an external user, this is not allowed". Such a response is problematic in that it suggests that "account information" was the trigger for the response which, in turn, implies that an "internal user" might have access to such account information; thereby encouraging a malicious actor to attempt other techniques for seeking account information about an internal or other user. If such an attempt is detected, then the obfuscation instruction could specify that the modified output include a response such as "I am unable to provide that information" without any further context. In other variations, the obfuscation instructions could cause the modified output to mislead the requesting user: "I do not have access to account information" or "I do not understand the query" or "Upload valid photo ID to verify identity", etc. In yet another variations, the obfuscation instructions can provide for a red-herring response in the modified output (i.e., a response that appears to be responsive but includes false or synthetic data) such as: "I have found the following account information: Frederick Allen Mayne, III—Account 4255181087, Routing 4181309735". In this case, the name is invented or otherwise inaccurate and the accounts are bogus Luhn-validated numbers (so they will pass an "is bank account" check-in code).

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective. In some variations, the external remediation resources 190 can include one or more machine learning models which can be instructed (using, for example, obfuscation instructions as described above), along with the original output to generate a modified output. As described above, these obfuscation instructions can take varying forms to modify an original output of the MLA 130 when undesired content/behavior is detected in one or more of the input or the original output.

Figure 3:
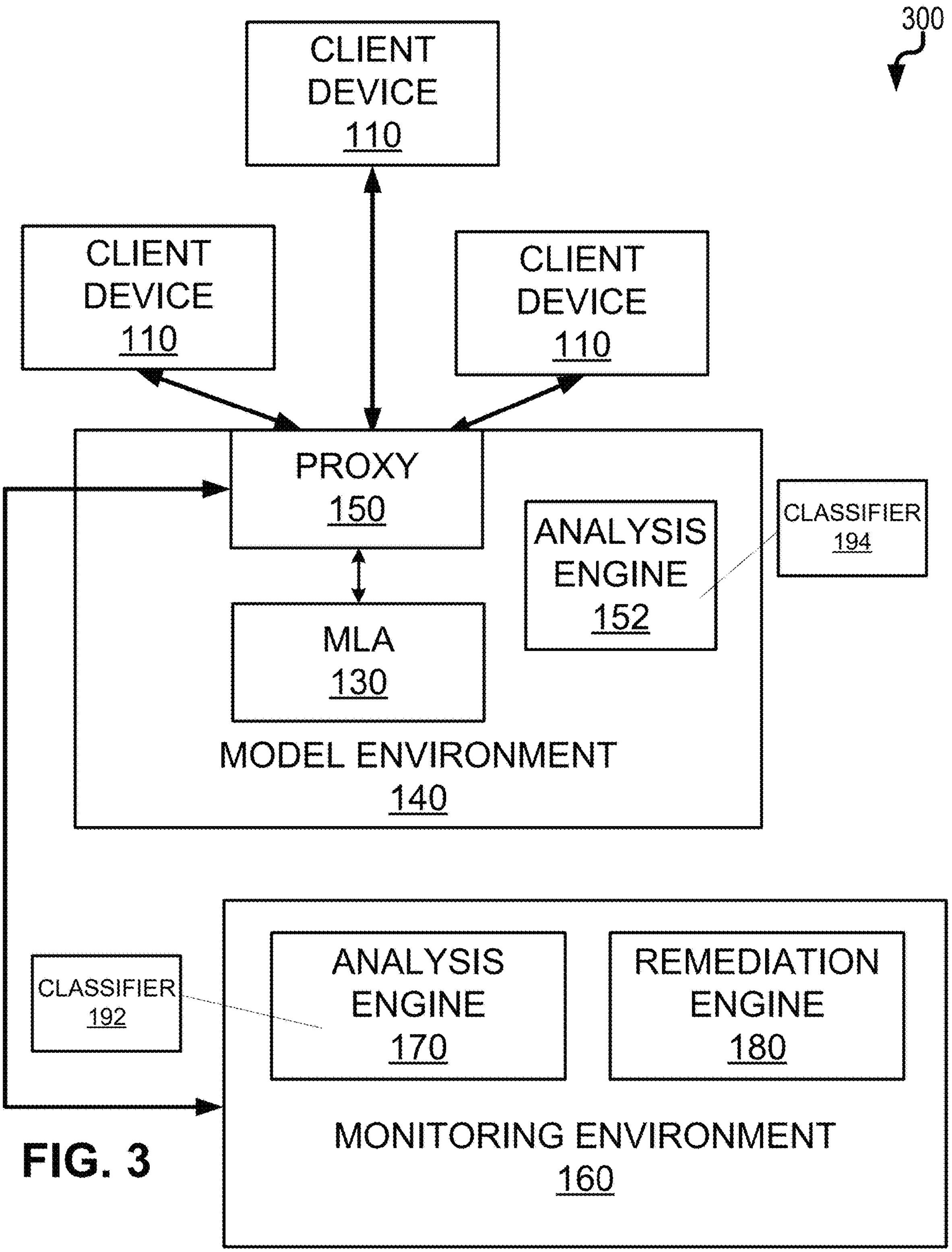
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170.

Figure 4:
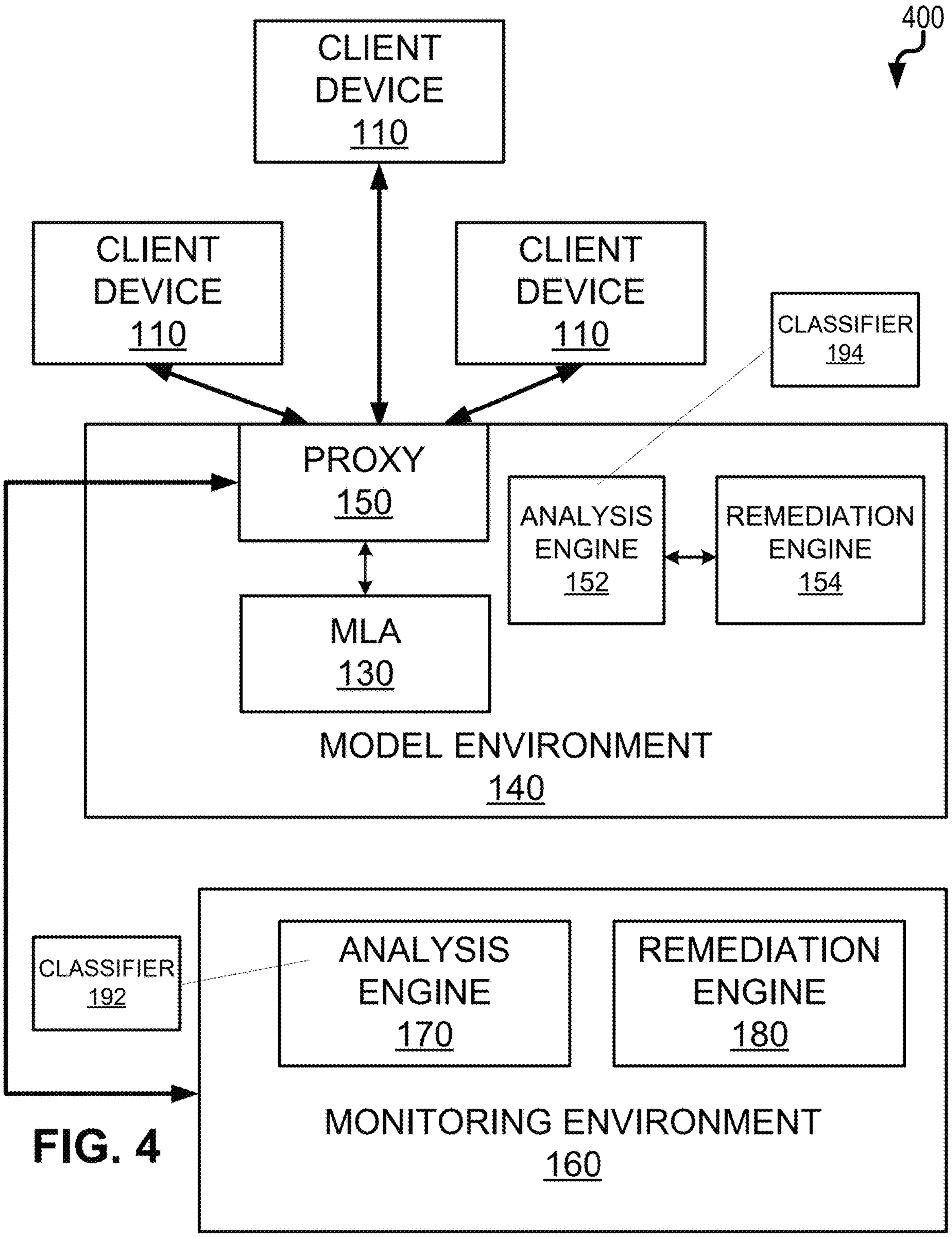
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
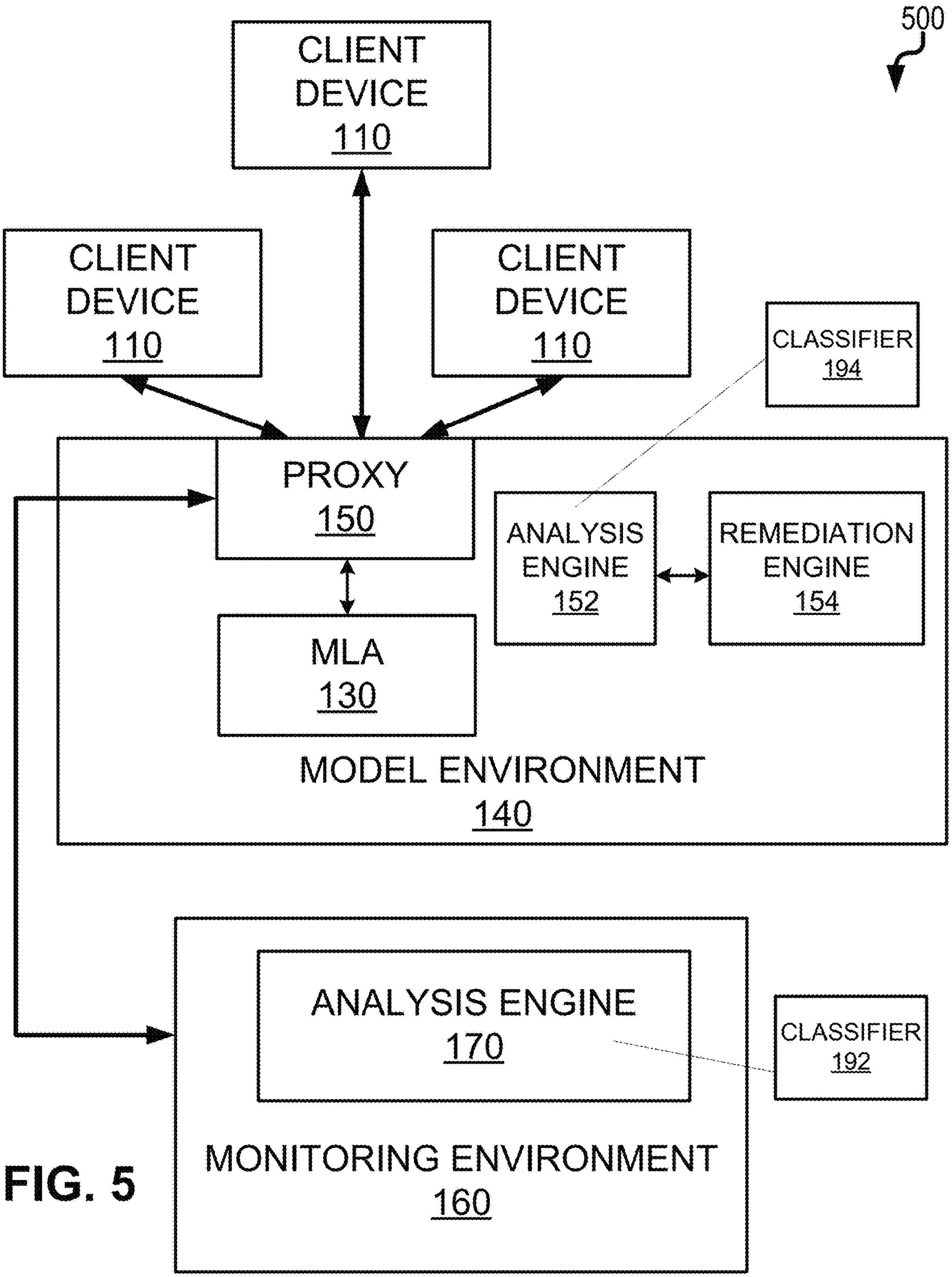
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
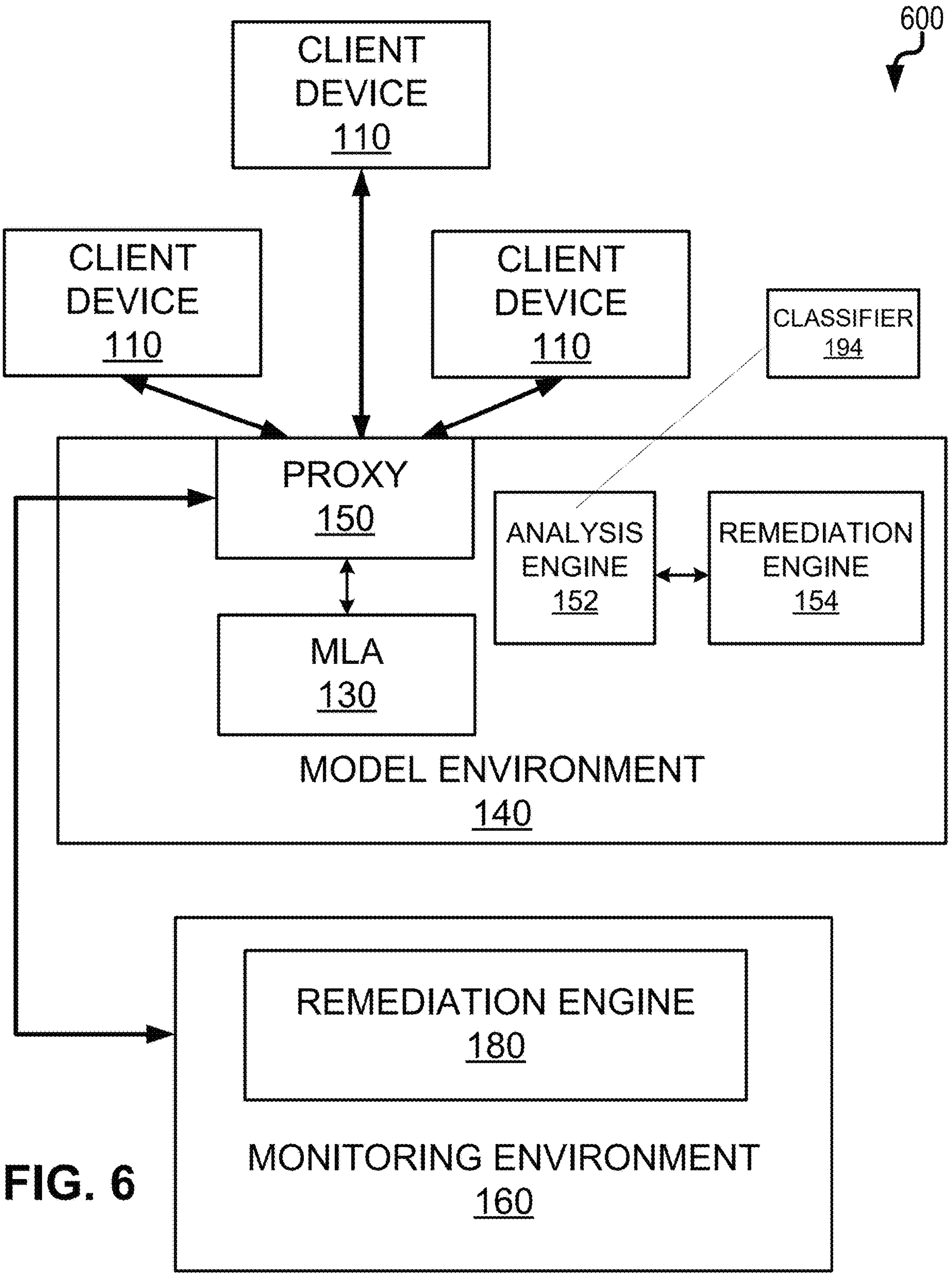
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
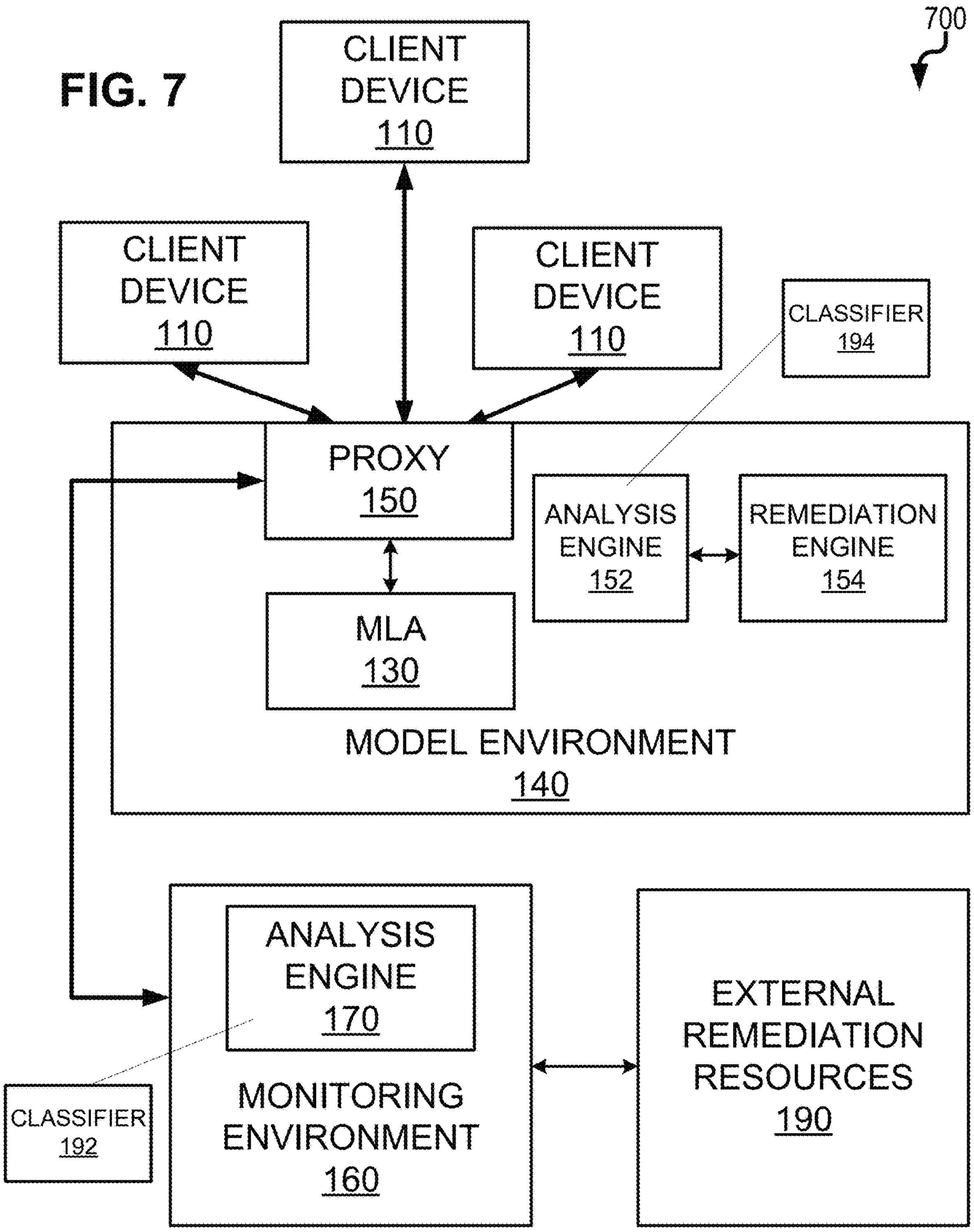
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
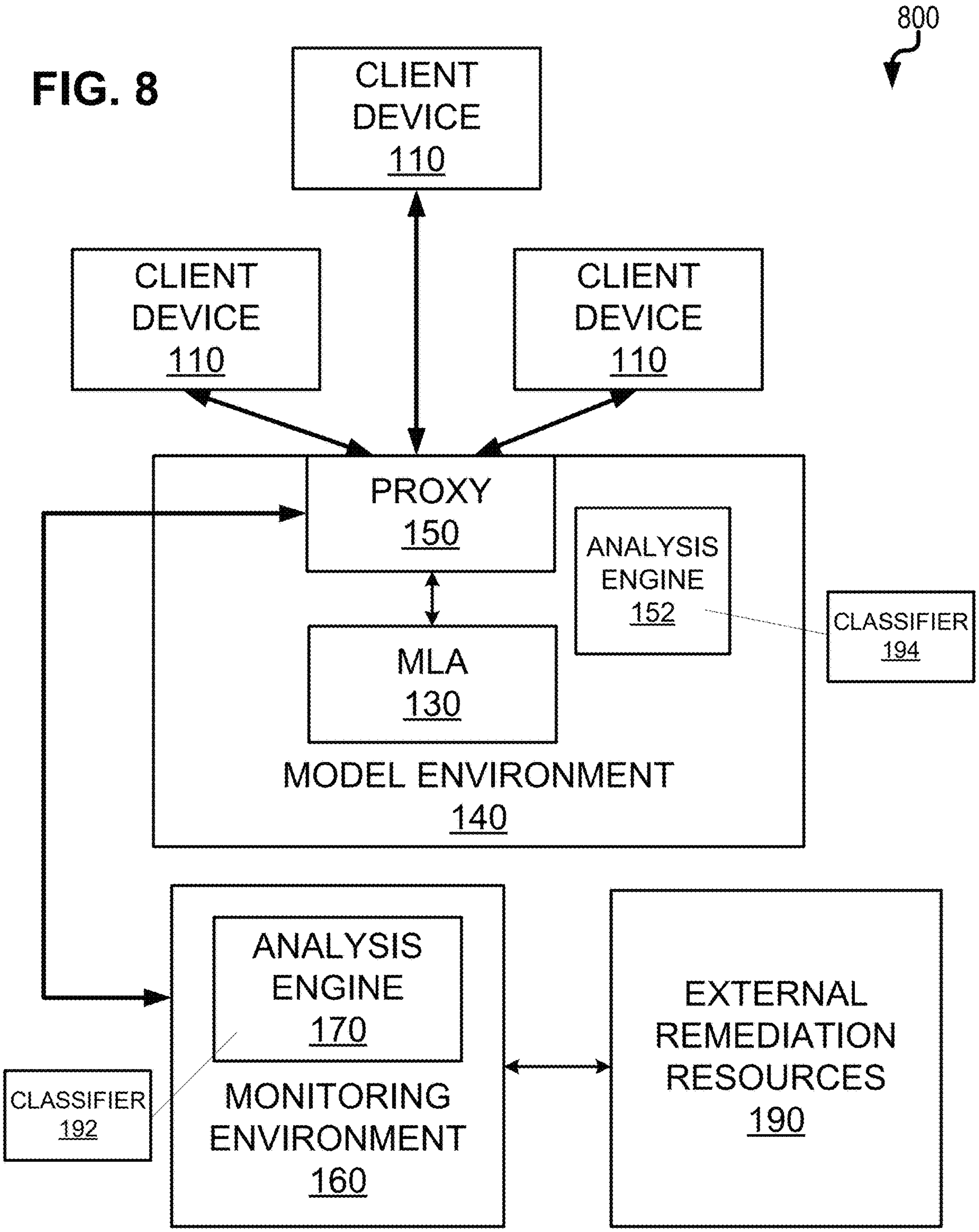
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
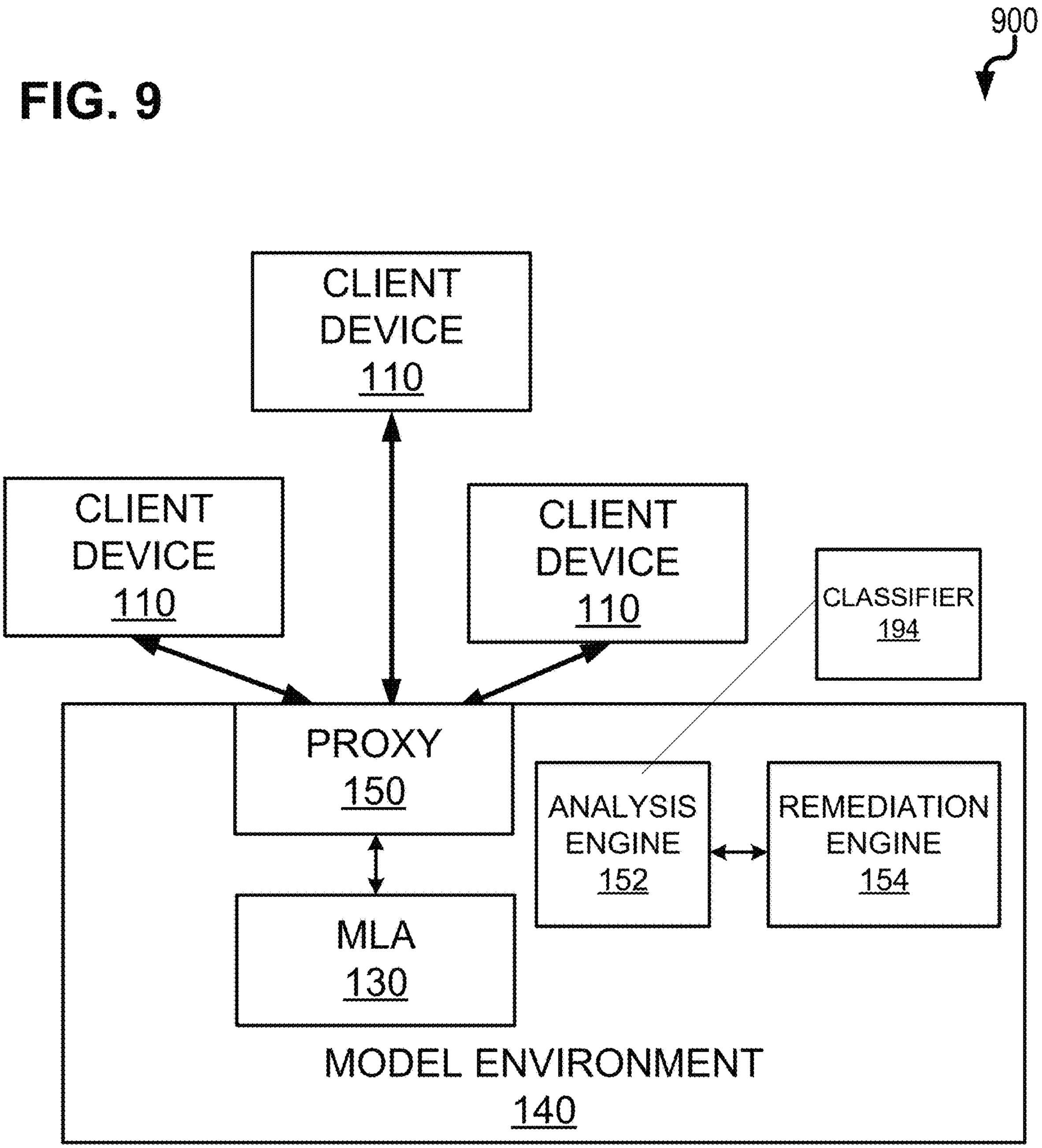
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment 140 (as opposed to a cloud-based approach involving the monitoring environment 160 as provided in other variations or by using external remediation resources 190 such as an external LLM, etc.).

Figure 10:
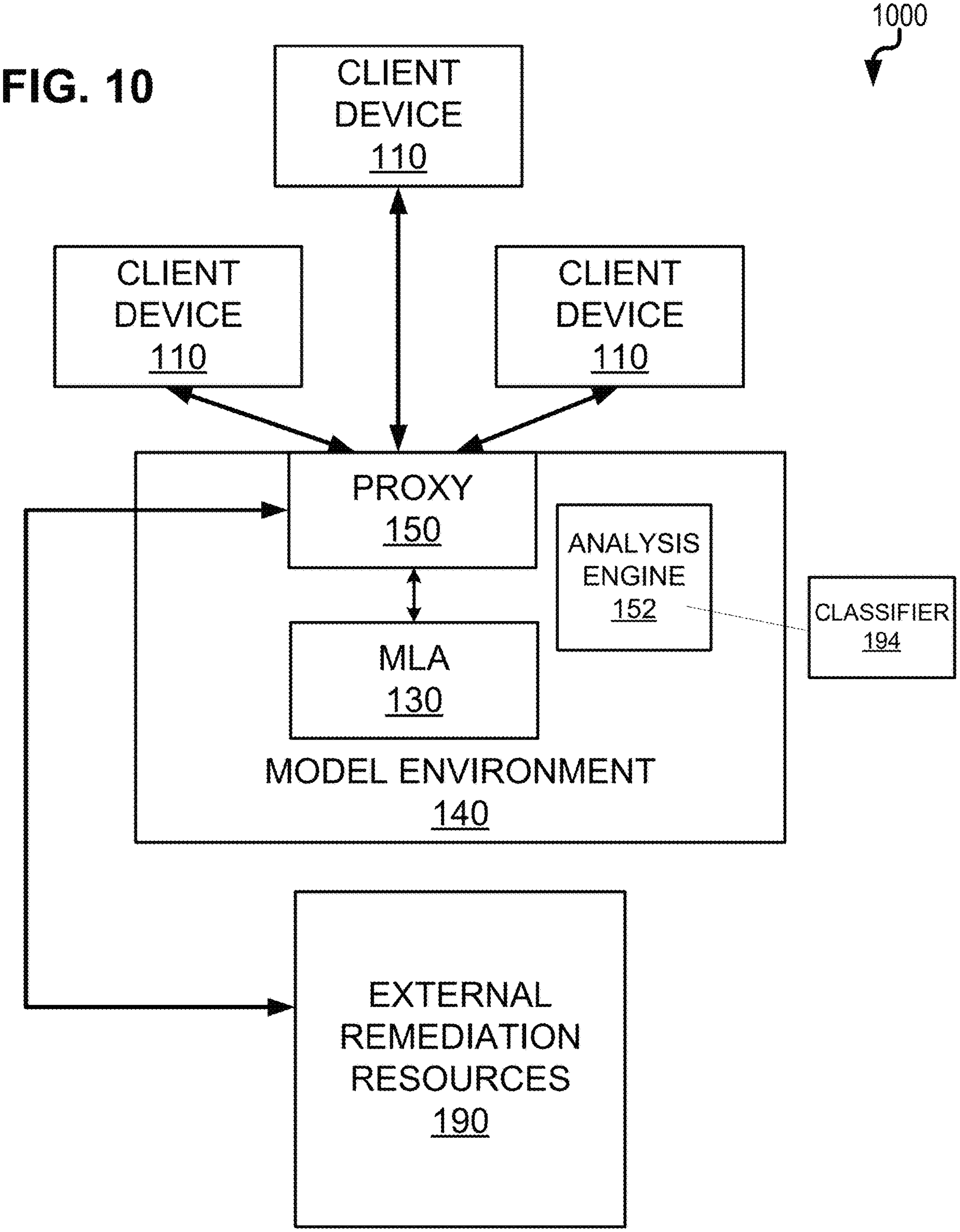
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

As indicated above, one or more of the analysis engines 152, 170 can include, execute, or otherwise instantiate a classifier 192, 194 which, in some variations, is a binary classifier which can identify a prompt as being (i) malicious or otherwise seeking undesired model behavior or (ii)

benign. In some variations, the classifier 192, 194 can be a multi-class classifier which can characterize different aspects of a prompt such as, but not limited to, a level of trustworthiness of the prompt (e.g., malicious/undesired, suspicious, benign, etc.). In some variations, the classifier 192, 194 can be a multi-class classifier which identifies which of a plurality of different attack types (i.e., attack types can include types of undesired model behavior) are implicated by an input prompt. Two or more of these classifiers 192, 194 can form an ensemble of classifiers (i.e., machine learning models). The ensemble of classifiers can be arranged such that two or more of the classifiers are executing in parallel. In other variations, the ensemble of classifiers can be arranged such that two or more classifiers are working in sequence. For example, a binary classifier can first analyze a prompt to determine whether the prompt is (i) malicious or otherwise seeking undesired model behavior or (ii) benign. If the prompt is classified as being malicious, a multi-class classifier can analyze the prompt to determine a particular type of injection attack. This classification by type can be used to take remediation actions which are specifically tailored to the type of attack. Such an arrangement can also be advantageous when the multi-class classifier is more computationally expensive than the binary classifier (which avoids every prompt being analyzed by the multi-class classifier). Other arrangements can be provided with a lightweight classified being executed by the analysis engine 152 in the model environment 140 and a more computationally expensive model can be executed by the analysis engine 170 in the monitoring environment 160.

The classifier 192, 194 can be a machine learning model such as an XGBoost classification model, a logistic regression model, an XLNet model and the like. In the case of a binary classifier, the classifier 192, 194 can be trained using a corpus of data which can include a plurality of benign prompts that do not seek malicious content or undesired model behavior and a plurality of prompts that contain various character strings (which can include portions of alphanumeric symbols, non-printable characters, symbols, controls, etc.) and the like which encapsulate various malicious content, elicits malicious content, or otherwise elicits undesired model behavior. Unless otherwise specified, malicious prompts in this context refer to prompts that cause the classifier 192, 194 to exhibit undesired behavior. Benign prompts in this context can refer to prompts that do not cause the classifier 192, 194 to exhibit undesired behavior. In some variations, the prompts forming part of the corpus can be labeled with their classification. The model training can be performed by converting the prompts into sentence embeddings which can, amongst other features, be used to train the classifier 192, 194.

In the case of a multi-class classifier, the training corpus for the classifier 192, 194 can include different sets of prompts for each category (i.e., severity level, type of attack, etc.) which are labeled with their category (e.g., security level, type of attack, etc.). The prompts can be transformed into sentence embeddings which can be used, amongst other features, to train the classifier 192, 194.

The classifier 192, 194 can be periodically retrained as new techniques for causing the MLA 130 to behave in undesired manner are identified and/or new remediation tools are created. Such an arrangement is advantageous in that the classifier 192, 194 can evolve to address the continually changing threat/user landscape.

After the classifier 192, 194 has been trained, the analysis engine 152, 170 can preprocess incoming prompts so that they are suitable for ingestion by the classifier 192, 194. For example, the raw/original prompt is transformed into sentence embeddings and then input into the classifier 192, 194 which then results in a model prediction. The model prediction for a binary classifier can predict the confidence of the classifier. The output of the model can take varying forms including, for example, a score closer to 1 indicating that the prompt is malicious and a score closer to 0 is indicating that the prompt is benign. The model prediction for the multi-class classifiers can identify a category for the prompt (i.e., a class for which the classifier 192, 194 has been trained).

The multi-class classifier variation of the classifier 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the classifier 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious prompts by injecting special case characters randomly or methodically, to confuse the MLA 130 to output a malicious response. A context continuation attack can include providing the MLA 130 with a single prompt or multiple prompts which follow some permutation of a pattern like: benign prompt, malicious prompt, benign prompt, continuation of malicious prompt and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the prompt and tasking the MLA 130 to decrypt the prompt specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the prompt (e.g., malicious, highly suspicious, unknown, unable to classify, etc.). One remediation activity can be to block the IP address of the requester (i.e., the computing device initiating or otherwise relaying the prompt/input for ingestions by the MLA 130). In some cases, multiple remediation activities can be utilized such as blocking an IP address in combination with a MAC address or terminating/restarting an HTTP session while also blocking the IP and MAC addresses.

The IP address can also be used to filter (i.e., modify or otherwise redact) prompts before they are input into the MLA 130. The remediation activities can also include generating alerts (e.g., sysadmin alerts) indicating suspicious/malicious prompts. Further, the remediation activities can include capturing system/process behavior associated with suspicious/malicious prompts for analytics or other tracking purposes.

Figure 11:
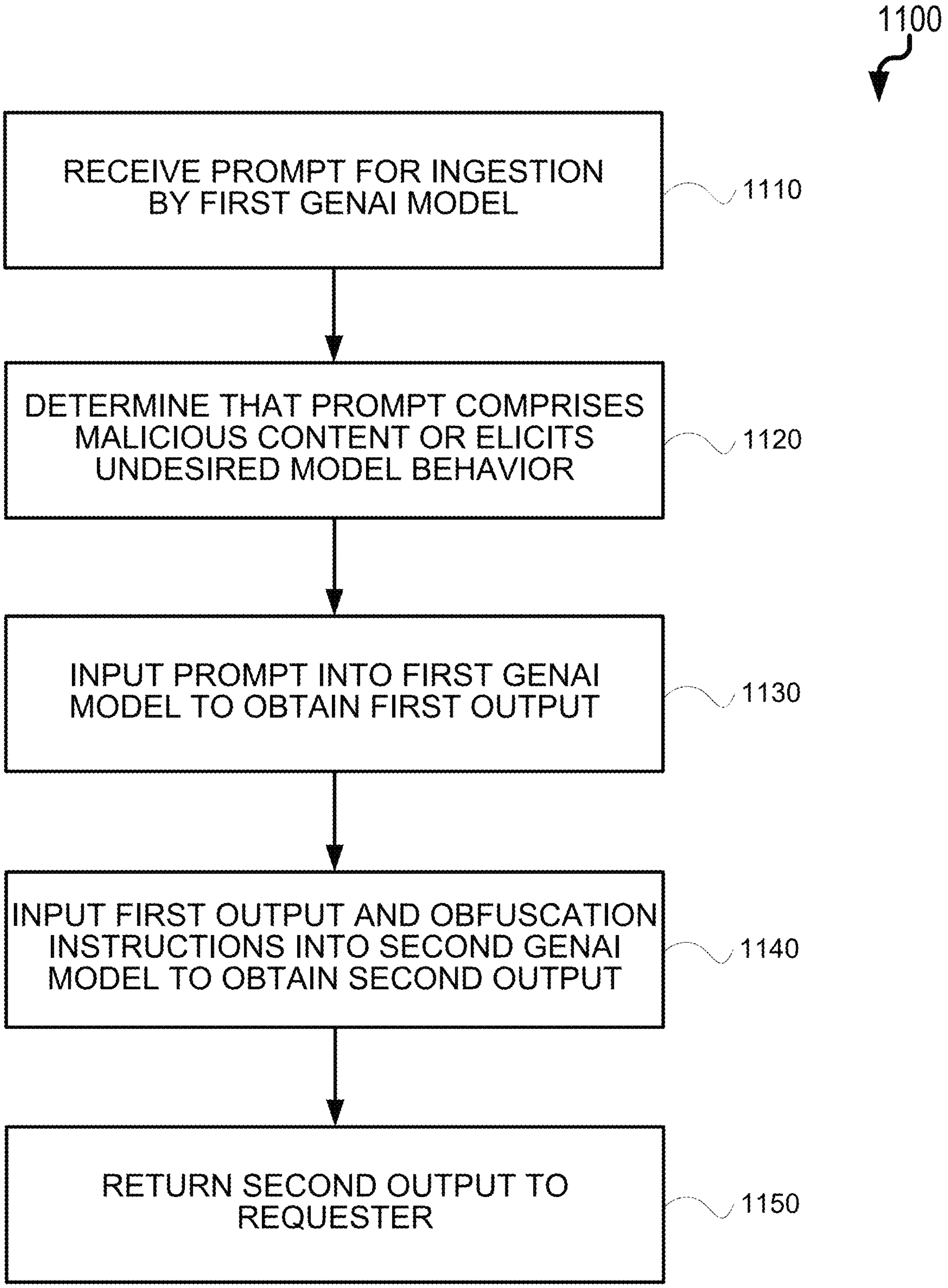
FIG. 11 is a process flow diagram illustrating a first machine learning-based technique for obfuscating an output of a GenAI model.

With reference to the process flow diagram 1100 of FIG. 11, data is received from a requester (e.g., a remote computing device/client device, etc.), at 1110, which characterizes a prompt for ingestion by a first generative artificial intelligence (GenAI) model. It can be determined, at 1120, that the prompt comprises malicious content or elicits undesired model behavior. Either before or after such determination, at 1130, at least a portion of the received data can be input into the GenAI model to obtain a first output. Based on the determination, at 1140, at least a portion of the first output along with obfuscation instructions can be input into a second GenAI model to obtain a second output. Data characterizing the second output is then returned, at 1150, to the requesting user.

Figure 12:
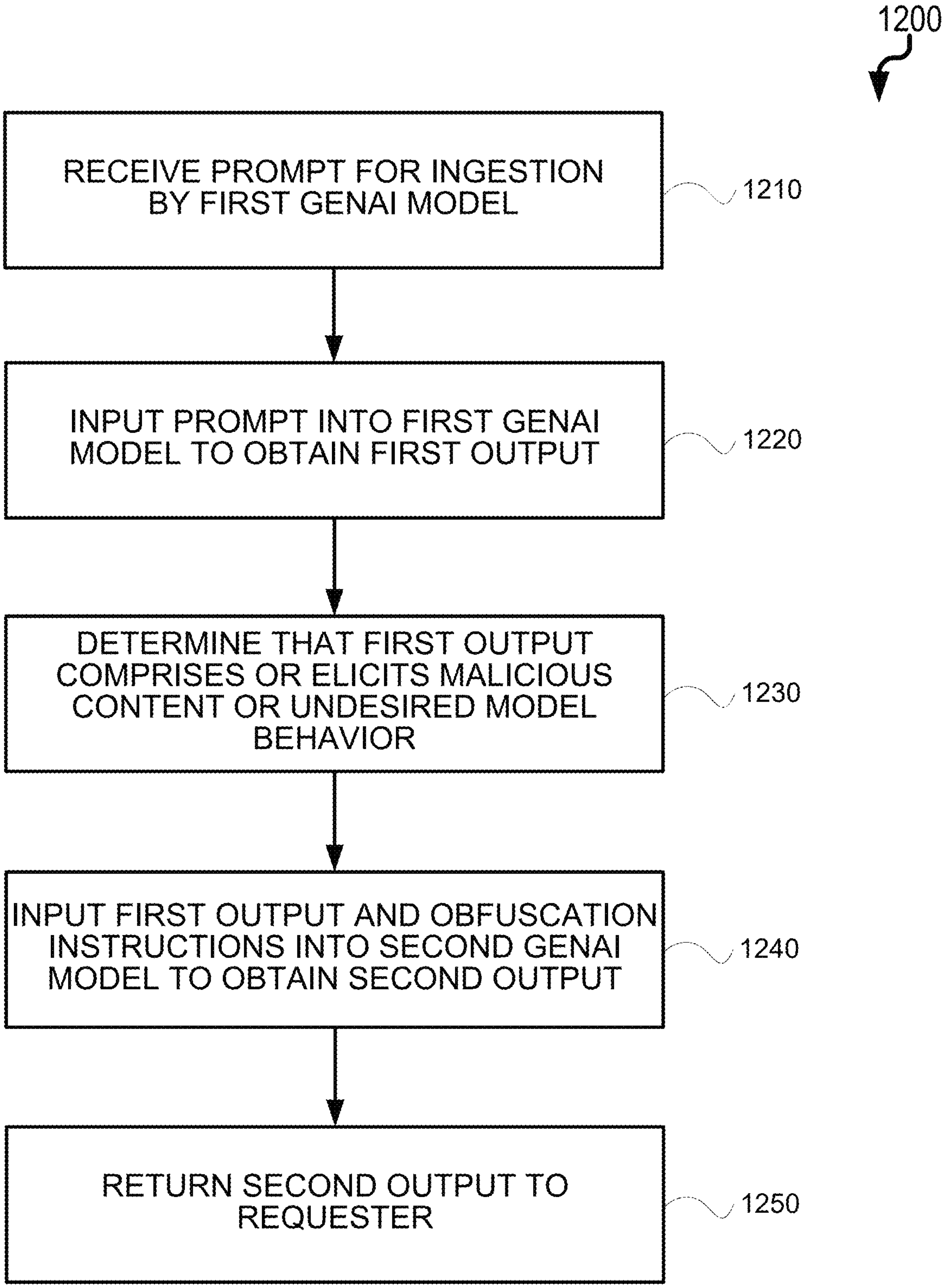
FIG. 12 is a process flow diagram illustrating a second machine learning-based technique for obfuscating an output of a GenAI model.

With reference to the process flow diagram 1200 of FIG. 12, data is received from a requester, at 1210, which characterizes a prompt for ingestion by a first GenAI model. At least a portion of the received data is input, at 1220, into the first GenAI model to obtain a first output. It is then determined, at 1230, that the first output comprises or elicits malicious or undesired content. In response, at 1240, at least a portion of the first output are input along with obfuscation instructions into a second GenAI model to obtain a second output. Data characterizing the second output is then returned, at 1250, to the requester.

Figure 13:
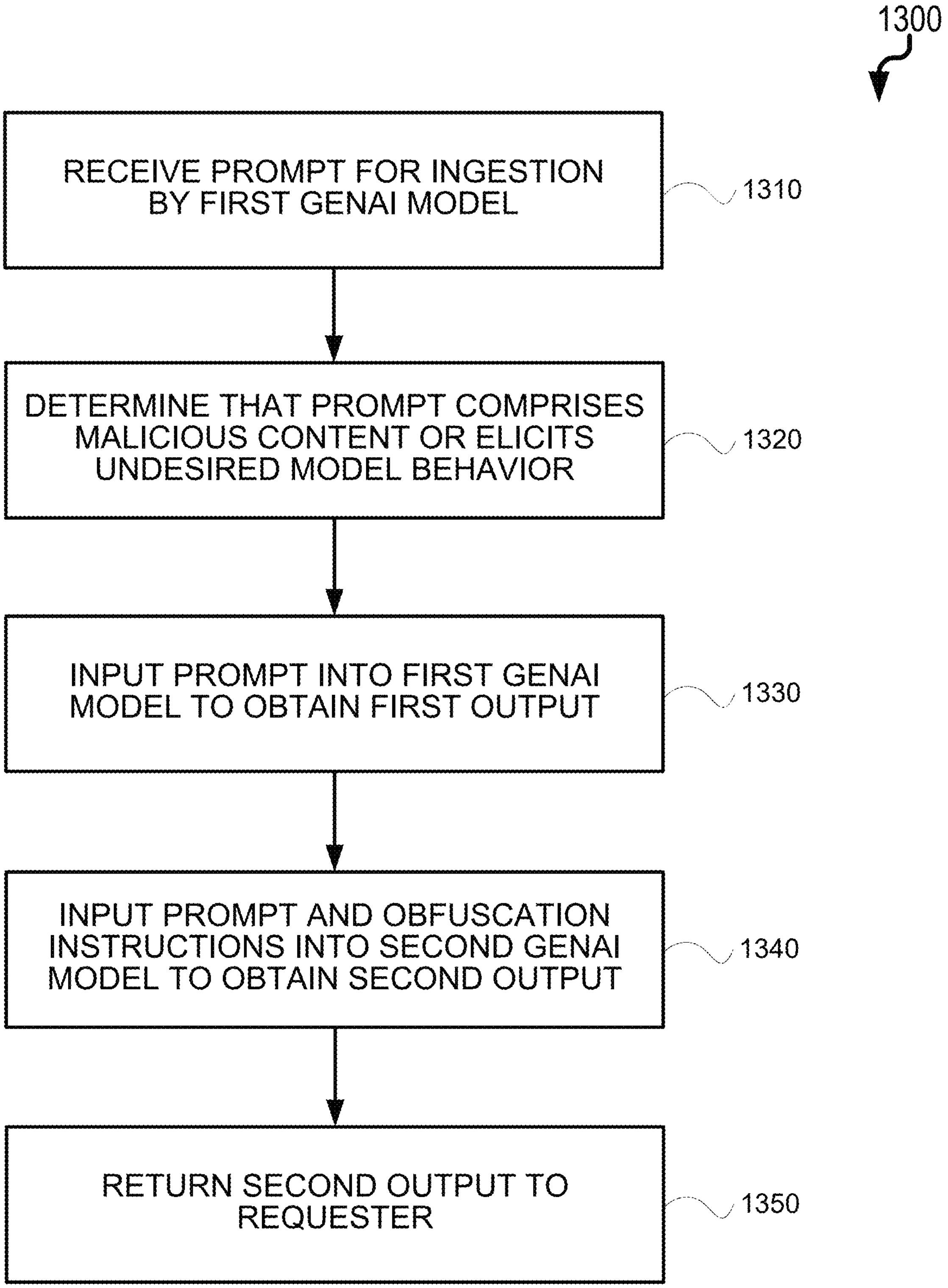
FIG. 13 is a process flow diagram illustrating a third machine learning-based technique for obfuscating an output of a GenAI model.

With reference to the process flow diagram 1300 of FIG. 13, a prompt is received from a requester, at 1310, for ingestion by a first GenAI model. It is determined, at 1320, that the prompt comprises or elicits malicious content or undesired model behavior. Before or after the determination, at 1330, the prompt is input into the first GenAI model to obtain a first output. Subsequently, at 1340, the prompt, the first output and accompanying obfuscation instructions are inputted into a second GenAI model to obtain a second output. Data characterizing the second output is then returned, at 1350, to the requester.

Figure 14:
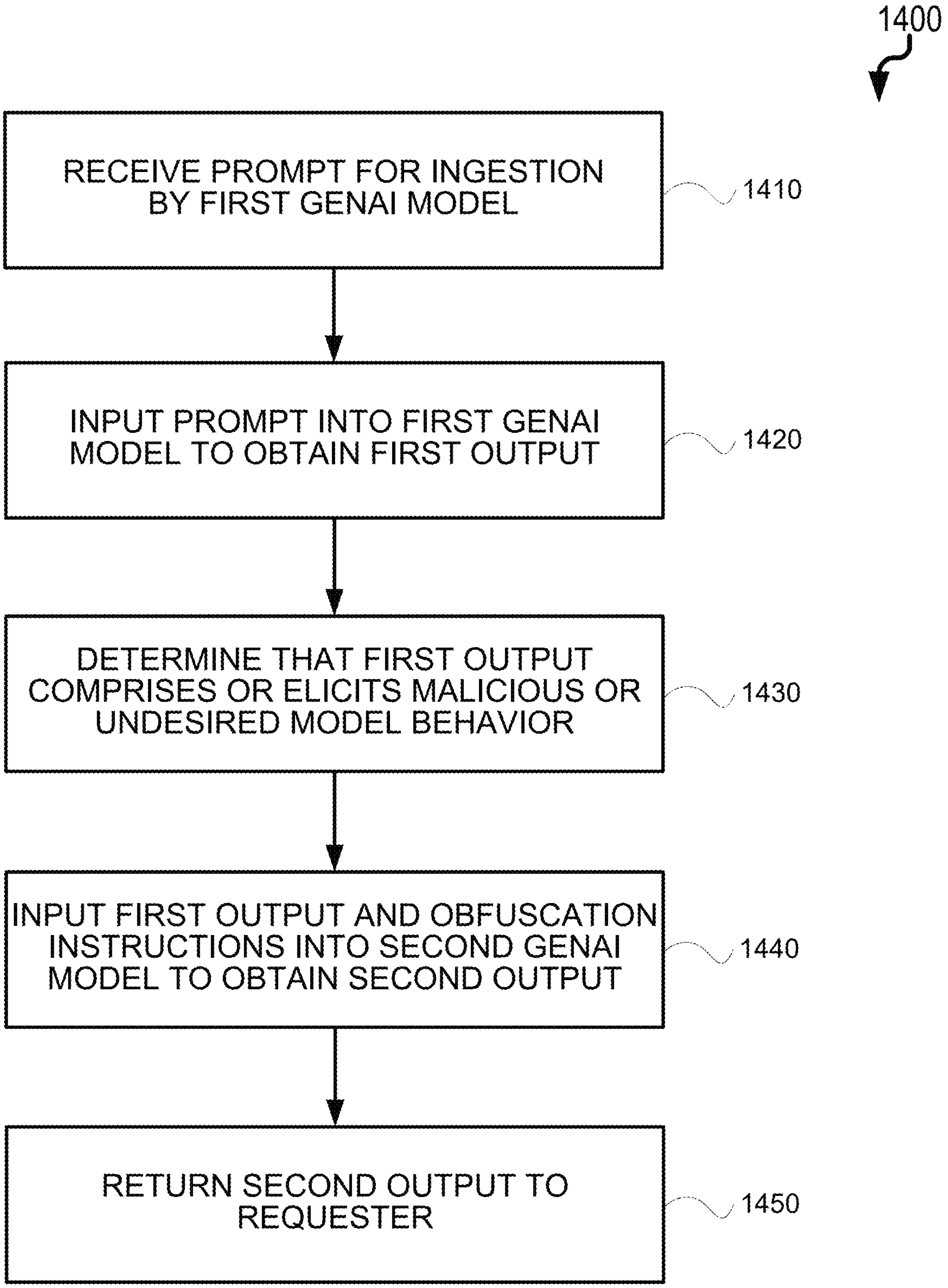
FIG. 14 is a process flow diagram illustrating a fourth machine learning-based technique for obfuscating an output of a GenAI model.

With reference to the process flow diagram 1400 of FIG. 14, a prompt is received from a requester, at 1410, for ingestion by a first GenAI model. The prompt is input into the first GenAI model, at 1420, to obtain a first output. It is later determined, at 1430, that the first output comprises or elicits malicious or undesired model behavior. Subsequently, at 1440, the prompt along with obfuscation instructions is input into a second GenAI model to obtain a second output. Data characterizing the second output is then returned, at 1450, to the requester. In some cases, the first output is also input into the second GenAI model along with the prompt and the obfuscation instructions.

Data which characterizes the various determinations can be provided to a consuming application or process. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190, the analysis engine 152 can provide the determination to the external remediation resources 190, and/or the determination can be transmitted to or otherwise consumed by a local or remote application or process. The analysis engine 152, 170 in this context can act as a gatekeeper to the GenAI model by sending information to a consuming application or process which results in preventing prompts deemed to be malicious from being input and allowing prompts deemed to be safe to be input. In some cases, the consuming application or process flags the prompt as being malicious for quality assurance upon a determination that the prompt comprises malicious content. In some cases, it may be desirable to modify a prompt (which can be performed by the consuming application or process) so that it ultimately is non-malicious. For example, only portions of the prompt may be deemed malicious and such aspects can be deleted or modified prior to ingestion by the GenAI model. Other actions can be taken based on the IP address of the requester (such as blocking the prompt, blocking subsequent prompts, modifying subsequent prompts, etc.). Such an arrangement still provides the attacker with an output/response thereby potentially masking the fact that the system identified the response as being malicious.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving, by a proxy executing in a model environment executing a first generative artificial intelligence (GenAI) model, a prompt originating from a requestor and for ingestion by the first GenAI model;

determining that the prompt comprises malicious content or elicits undesired model behavior;

inputting at least a portion of the prompt into the first GenAI model to obtain a first output;

inputting at least a portion of the first output along with obfuscation instructions into a second GenAI model to obtain a second output, the second GenAI model executing in an environment different than the model environment and remote from the first GenAI model, the second GenAI model generating the second output external to the model environment, the obfuscation instructions directing the second GenAI model to modify the first output by at least one of replacing identified content with synthetic data or redacting identified content; and returning, by way of the proxy, data including or based on the second output to the requester.

2. The method of claim 1, wherein the determination is based on a classification by a classifier.

3. The method of claim 1, wherein the determination is based on a blocklist defining content deemed to be malicious or eliciting undesired model behavior.

4. The method of claim 1, wherein the first GenAI model is different than the second GenAI model.

5. The method of claim 1, wherein the first GenAI model and the second GenAI model are of a same model type.

6. The method of claim 1, wherein at least one of the first GenAI model or the second GenAI model comprises a large language model.

7. The method of claim 1, wherein the obfuscation instructions identify a portion of content in the first output comprising sensitive, malicious, or non-compliant information that requires modification.

8. The method of claim 7, wherein the modification comprises generating synthetic data corresponding to the identified portion of content.

9. The method of claim 7, wherein the modification comprises redacting data corresponding to the identified portion of content.

10. The method of claim 1 further comprising inputting at least a portion of data characterizing the prompt into the second GenAI model along with the at least a portion of the first output and the obfuscation instructions to obtain the second output.

11. The method of claim 1, wherein the obfuscation instructions cause the second GenAI model to generate a red-herring response comprising synthetic data that appears responsive to the prompt but includes false or synthetic data.

12. The method of claim 11, wherein the synthetic data comprises Luhn-validated account numbers.

13. The method of claim 1, wherein the obfuscation instructions cause the second GenAI model to generate a modified output without context indicating a reason for withholding the information.

14. The method of claim 1, wherein the determination that the prompt comprises malicious content or elicits undesired model behavior is based on a multi-class classifier that identifies a type of attack from a plurality of attack types.

15. The method of claim 14, wherein the obfuscation instructions are based on the identified type of attack.

16. The method of claim 1, wherein the obfuscation instructions cause the second GenAI model to remove executable code from the first output or generate pseudocode corresponding to the executable code.

17. The method of claim 1, wherein the determination that the prompt comprises malicious content or elicits undesired model behavior is based on an ensemble of classifiers comprising a binary classifier and a multi-class classifier operating in sequence, wherein the binary classifier first determines whether the prompt is malicious or benign, and the multi-class classifier identifies a type of attack when the binary classifier determines the prompt is malicious.

18. A computer-implemented method comprising:

receiving, by a proxy executing in a model environment executing a first generative artificial intelligence (GenAI) model, data characterizing a prompt initiated by a requestor and for ingestion by the first GenAI model;

inputting at least a portion of the received data into the first GenAI model to obtain a first output;

determining that the first output comprises or elicits malicious or undesired content;

inputting at least a portion of the first output along with obfuscation instructions to a second GenAI model to obtain a second output, the second GenAI model executing in an environment different than the model environment and remote from the first GenAI model, the second GenAI model generating the second output external to the model environment, the obfuscation instructions directing the second GenAI model to modify the first output by at least one of replacing identified content with synthetic data or redacting identified content; and returning data characterizing the second output to the requester.

19. The method of claim 18, wherein the determination is based on a classification by a classifier.

20. The method of claim 18, wherein the determination is based on a blocklist defining content deemed to be malicious or eliciting undesired model behavior.

21. The method of claim 18, wherein the first GenAI model is different than the second GenAI model.

22. The method of claim 18, wherein the first GenAI model and the second GenAI model are of a same model type.

23. The method of claim 18, wherein at least one of the first GenAI model or the second GenAI model comprises a large language model.

24. The method of claim 18, wherein the obfuscation instructions identify a portion of content in the first output comprising sensitive, malicious, or non-compliant information that requires modification.

25. The method of claim 24, wherein the modification comprises generating synthetic data corresponding to the identified portion of content.

26. The method of claim 24, wherein the modification comprises redacting data corresponding to the identified portion of content.

27. The method of claim 18, further comprising inputting at least a portion of the data characterizing the prompt into the second GenAI model along with the at least a portion of the first output and the obfuscation instructions to obtain the second output.

28. The method of claim 18, wherein the obfuscation instructions are configured so that the second GenAI model generates a response that appears to the requester as a legitimate model response.

29. A computer-implemented method comprising:

receiving, from a requester by way of a proxy executing in a model environment, a prompt for ingestion by a first generative artificial intelligence (GenAI) model executing in the model environment;

determining that the prompt comprises or elicits malicious content or undesired model behavior;

inputting the prompt into the first GenAI model to obtain a first output;

inputting the prompt, the first output, and obfuscation instructions into a second GenAI model to obtain a second output, the second GenAI model executing in an environment different than the model environment and remote from the first GenAI model, the second GenAI model generating the second output external to the model environment; and returning data characterizing the second output to the requester.

30. A computer-implemented method comprising:

receiving, from a requester, a prompt for ingestion by a first generative artificial intelligence (GenAI) model;

inputting the prompt into the first GenAI model to obtain a first output;

determining whether the first output comprises or elicits malicious or undesired model behavior;

initiating remediation actions when it is determined that the first output comprises or elicits malicious or undesired model behavior comprising:

inputting the prompt along with obfuscation instructions into a second GenAI model to obtain a second output, the second GenAI model executing in an environment different than a model environment executing the first GenAI model and remote from the first GenAI model, the second GenAI model generating the second output external to the model environment, the obfuscation instructions causing the second GenAI model to generate the second output as a modified version of the first output; and returning data characterizing the second output to the requester; and returning data characterizing the first output to the requester when it is determined that the first output does not comprise or elicit malicious or undesired model behavior.

* * * * *